(12) United States Patent
Noguchi et al.

(10) Patent No.: US 11,305,769 B2
(45) Date of Patent: Apr. 19, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Yasushi Shoda, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 16/706,934

(22) Filed: Dec. 9, 2019

(65) Prior Publication Data

US 2020/0207350 A1   Jul. 2, 2020

(30) Foreign Application Priority Data

Dec. 28, 2018   (JP) .............................. JP2018-246633

(51) Int. Cl.
*B60W 30/18*   (2012.01)
*B60W 10/30*   (2006.01)
(Continued)

(52) U.S. Cl.
CPC ...... *B60W 30/18009* (2013.01); *B60W 10/04* (2013.01); *B60W 10/20* (2013.01); *B60W 10/30* (2013.01)

(58) Field of Classification Search
CPC .......... B60W 30/18009; B60W 10/30; B60W 10/20; B60W 10/04; B60S 1/0896
(Continued)

(56) References Cited

U.S. PATENT DOCUMENTS

2016/0210858 A1*  7/2016  Foster ................. G08G 1/0965
2017/0124029 A1*  5/2017  Houston ............. G06F 16/9577
(Continued)

FOREIGN PATENT DOCUMENTS

JP    2010-143499    7/2010
JP    2016-150688    8/2016
(Continued)

OTHER PUBLICATIONS

Japanese Office Action for Japanese Patent Application No. 2018-246633 dated Oct. 12, 2021.

*Primary Examiner* — Jonathan M Dager
*Assistant Examiner* — Jean W Charleston
(74) *Attorney, Agent, or Firm* — Amin, Turocy & Watson, LLP

(57) ABSTRACT

A vehicle control system includes: a recognizer that recognizes a surrounding environment of a vehicle; a driving controller that performs speed control and steering control of the vehicle regardless of an operation of an occupant on the basis of a recognition result obtained by the recognizer; and a wiper controller that controls a wiper attached to a window of the vehicle, wherein the wiper controller changes a degree of operation of the wiper according to a boarding position and a degree of approach when the vehicle moves to the boarding position at which an occupant boards the vehicle after the vehicle starts traveling under the control of the driving controller or when the vehicle starts traveling to move away from the boarding position under the control of the driving controller after the occupant alights from the vehicle.

15 Claims, 10 Drawing Sheets

(51) Int. Cl.
*B60W 10/20* (2006.01)
*B60W 10/04* (2006.01)

(58) Field of Classification Search
USPC .......................................................... 701/48
See application file for complete search history.

(56) References Cited

U.S. PATENT DOCUMENTS

| | | | |
|---|---|---|---|
| 2017/0332010 A1* | 11/2017 | Asakura ............... | G05D 1/0223 |
| 2018/0079414 A1* | 3/2018 | Tellis .................... | B60W 50/12 |
| 2018/0233047 A1* | 8/2018 | Mandeville-Clarke ...................... | B60W 30/00 |
| 2018/0345953 A1* | 12/2018 | Mizoguchi ...... | B60W 30/18145 |
| 2020/0031344 A1* | 1/2020 | Okano ................. | B60W 30/12 |
| 2020/0207348 A1* | 7/2020 | Sato ................. | B60W 60/0053 |

FOREIGN PATENT DOCUMENTS

| | | | |
|---|---|---|---|
| JP | 2016150688 A | * | 8/2016 |
| JP | 2017-202768 | | 11/2017 |
| JP | 2018-070099 | | 5/2018 |
| JP | 2018-151858 | | 9/2018 |
| JP | 2018-156641 | | 10/2018 |

* cited by examiner

VEHICLE CONTROL SYSTEM, VEHICLE CONTROL METHOD, AND STORAGE MEDIUM

CROSS-REFERENCE TO RELATED APPLICATION

This application claims priority to and the benefit from Japanese Patent Application No. 2018-246633, filed on Dec. 28, 2018, the contents of which are hereby incorporated by reference into the present application.

BACKGROUND

Field of the Invention

The present invention relates to a vehicle control system, a vehicle control method, and a storage medium.

Description of Related Art

Conventionally, a technology of detecting that a vehicle is in a parking state during operation of a wiper and stopping the wiper in the parking state is known (for example, see Japanese Patent Application Publication No. 2018-70099). Conventionally, a technology of controlling operation of a wiper depending on a surrounding situation of a vehicle is known (for example, see Japanese Patent Application Publication No. 2016-150688). Conventionally, a technology of minimizing raindrops on a front window of an automobile, splashing toward pedestrians or the like when a wiper blade restarts moving during restart of an engine is known (for example, see Japanese Patent Application Publication No. 2010-143499).

SUMMARY

However, when a vehicle controlled by automated driving goes to meet an occupant, if a wiper operates actively in a place where occupants board or alight, water drops may splash onto a person present in that place.

The present invention has been made in consideration of these circumstances and one object thereof is to provide a vehicle control system, a vehicle control method, and a storage medium capable of controlling a wiper to an appropriate degree depending on a situation of a vehicle.

A vehicle control system, a vehicle control method, and a storage medium according to the present invention employ the following configuration.

(1) A vehicle control system according to an aspect of the present invention includes: a recognizer that recognizes a surrounding environment of a vehicle; a driving controller that performs speed control and steering control of the vehicle regardless of an operation of an occupant on the basis of a recognition result obtained by the recognizer; and a wiper controller that controls a wiper attached to a window of the vehicle, wherein the wiper controller changes a degree of operation of the wiper according to a boarding position and a degree of approach when the vehicle moves to the boarding position at which an occupant boards the vehicle after the vehicle starts traveling under the control of the driving controller or when the vehicle starts traveling to move away from the boarding position under the control of the driving controller after the occupant alights from the vehicle.

(2) In aspect (1), the wiper controller changes a degree of operation of the wiper according to an approach of the vehicle to a position at which the occupant boards the vehicle when the driving controller stops the vehicle to allow the occupant to board the vehicle after causing the vehicle to start traveling from a state in which the vehicle is parked.

(3) In aspect (1), the wiper controller changes a degree of operation of the wiper according to an approach of the vehicle to a position at which the occupant boards the vehicle when the driving controller stops the vehicle to allow the occupant to board the vehicle after causing the vehicle to start traveling from a state in which the vehicle is parked in an unmanned parking area, and the position at which the occupant boards the vehicle is a boarding area determined in advance in correspondence to the unmanned parking area.

(4) In aspect (1), the wiper controller changes a degree of operation of the wiper according to an approach of the vehicle to a stopping area when the driving controller stops the vehicle in a stopping area having eaves to allow the occupant to board the vehicle after causing the vehicle to start traveling.

(5) In aspect (1), the wiper controller decreases the degree of operation of the wiper when the recognizer recognizes a person around the position at which the occupant boards the vehicle as compared to when no person is recognized.

(6) In aspect (5), the wiper controller decreases the degree of operation of the wiper on a side in front of a position of the person recognized by the recognizer.

(7) In aspect (5), the wiper controller restores the degree of operation of the wiper to an original state after the occupant boards the vehicle when the person recognized by the recognizer is only the occupant of the vehicle.

(8) In aspect (7), the wiper controller decreases a degree of restoring the degree of operation of the wiper to an original state when the person recognized by the recognizer is not only the occupant of the vehicle as compared to when the recognized person is only the occupant of the vehicle.

(9) In aspect (1), the wiper controller causes the wiper to wipe the window before changing the degree of operation of the wiper.

(10) In aspect (1), the wiper controller changes the degree of operation of the wiper on the basis of a position of eaves and an approach to the boarding position when the recognizer recognizes that the eaves are present at the position at which the occupant boards the vehicle.

(11) A vehicle control method according to an aspect of the present invention causes a computer to execute: recognizing a surrounding environment of a vehicle; performing speed control and steering control of the vehicle regardless of an operation of an occupant on the basis of a recognition result; controlling a wiper attached to a window of the vehicle; and changing a degree of operation of the wiper according to a boarding position and a degree of approach when the vehicle moves to the boarding position at which the occupant boards the vehicle after the vehicle starts traveling or when the vehicle starts traveling to move away from the boarding position after the occupant alights from the vehicle.

(12) A storage medium according to an aspect of the present invention stores a program for causing a computer to execute: recognizing a surrounding environment of a vehicle; performing speed control and steering control of the vehicle regardless of an operation of an occupant on the basis of a recognition result; controlling a wiper attached to a window of the vehicle; and changing a degree of operation of the wiper according to a boarding position and a degree of approach when the vehicle moves to the boarding position at which the occupant boards the vehicle after the vehicle starts traveling or when the vehicle starts traveling to move away from the boarding position after the occupant alights from the vehicle.

According to aspects (1) to (12), it is possible to control the wiper to an appropriate degree depending on a situation of a vehicle.

According to aspects (5) and (6), it is possible to prevent raindrops wiped away by the wiper from being splashed to a person.

According to aspect (7), it is possible to provide satisfactory visibility to an occupant immediately after getting in a vehicle.

According to aspect (8), it is possible to prevent raindrops wiped away by the wiper from being splashed to a person even after an occupant boards a vehicle.

According to aspect (9), it is possible to suppress the degree of blocking the visibility due to change in wiper sensitivity as much as possible.

DETAILED DESCRIPTION OF THE INVENTION

Hereinafter, embodiments of a vehicle control device, a vehicle control method, and a storage medium of the present invention will be described with reference to the drawings.
[Overall Configuration]

Figure 1:
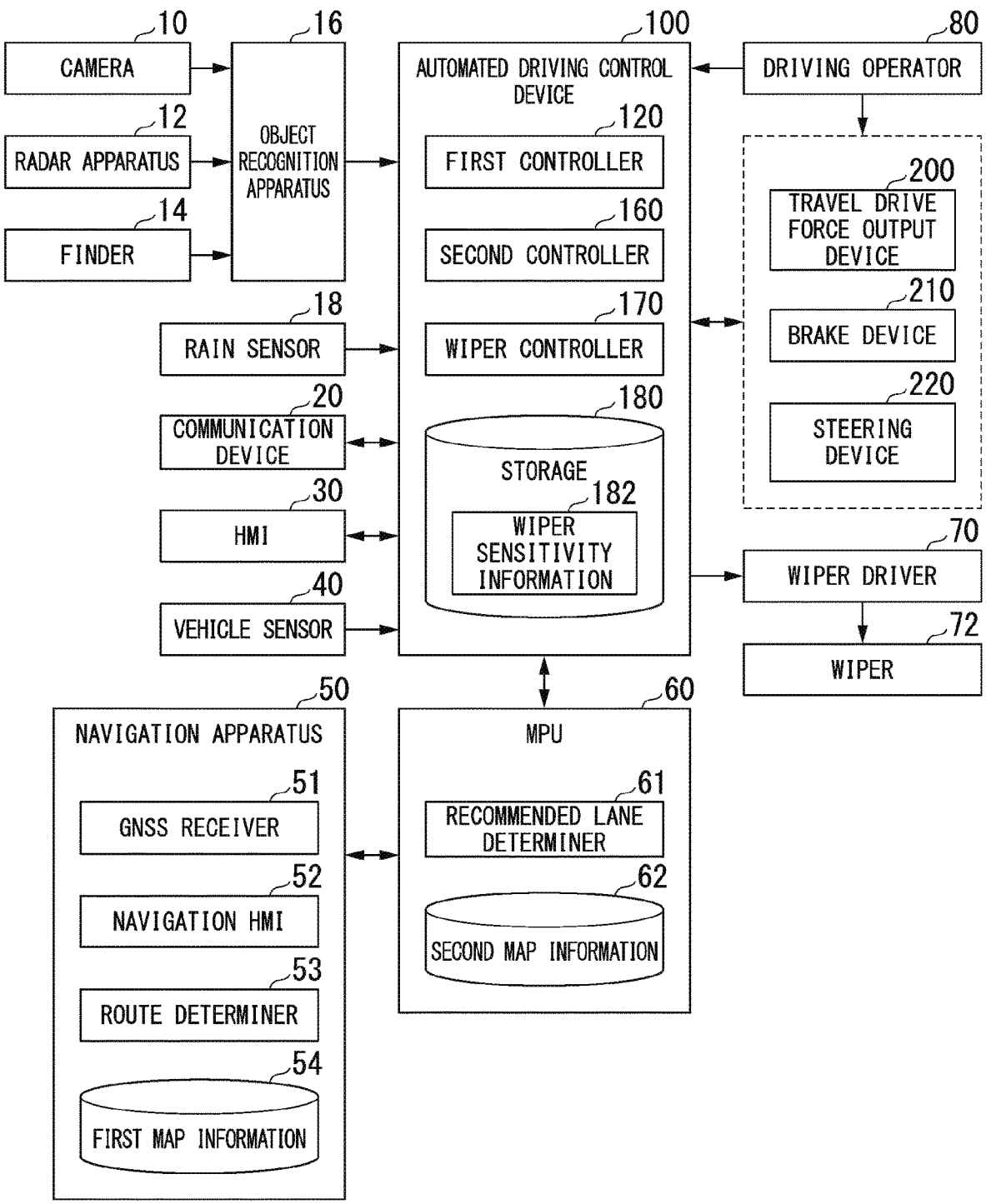
FIG. 1 is a block diagram of a vehicle system 1 which uses a vehicle control device according to an embodiment.

FIG. 1 is a block diagram of a vehicle system 1 which uses a vehicle control device according to an embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. An electric motor operates using electric power generated by a generator connected to an internal combustion engine or an electric power discharged by secondary batteries or fuel-cell batteries.

The vehicle system 1 includes, for example, a camera 10, a radar apparatus 12, a finder 14, an object recognition apparatus 16, a communication device 20, a human machine interface (HMI) 30, a vehicle sensor 40, a navigation apparatus 50, a map positioning unit (MPU) 60, a wiper driver 70, a wiper 72, a driving operator 80, an automated driving control device 100, a travel drive force output device 200, a brake device 210, and a steering device 220. These apparatuses and devices are connected to each other by a multiplex communication line such as a controller area network (CAN) communication line, a serial communication line, a wireless communication network, and the like. Moreover, the components illustrated in FIG. 1 are examples only, some components may be omitted and other components may be added.

The camera 10 is, for example, a digital camera which uses a solid-state imaging device such as a charge coupled device (CCD) or a complementary metal oxide semiconductor (CMOS). The camera 10 is attached to an arbitrary position of a vehicle (hereinafter referred to as a host vehicle M) in which the vehicle system 1 is mounted. When capturing images on the front side, the camera 10 is attached to an upper part of a front windshield or a back surface of a rear-view mirror. The camera 10, for example, captures the images around the host vehicle M repeatedly and periodically. The camera 10 may be a stereo camera.

The radar apparatus 12 emits radio waves such as millimeter waves to the surroundings of the host vehicle M and detects radio waves (reflected waves) reflected from an object to detect at least the position (the distance and direction) of the object. One or a plurality of radar apparatuses 12 are attached to arbitrary positions of the host vehicle M. The radar apparatus 12 may detect the position and the speed of an object according to a frequency modulated continuous wave (FM-CW) method.

The finder 14 is a light detection and ranging (LIDAR). The finder 14 radiates light to the periphery of the host vehicle M and measures scattering light. The finder 14 detects the distance to an object on the basis of the time taken to receive light after the light was emitted. The radiated light is pulsating laser light, for example. The finder 14 is attached to an arbitrary position on the host vehicle M.

The object recognition apparatus 16 performs sensor fusion processing on detection results obtained by some or all of the camera 10, the radar apparatus 12, and the finder 14 to recognize the position, the kind, the speed, and the like of an object. The object recognition apparatus 16 outputs the recognition results to the automated driving control device 100. The object recognition apparatus 16 may output the detection results obtained by the camera 10, the radar apparatus 12, and the finder 14 to the automated driving control device 100 as they are. The object recognition apparatus 16 may be omitted from the vehicle system 1.

A rain sensor 18 is provided on a vehicle-interior side of a front window, for example, to radiate infrared rays toward the front window and receive infrared rays reflected from the front window or raindrops to detect the amount of rainfall Ra. The rain sensor 18 may be provided at a position other than the front window as long as it is possible to detect the amount of rainfall Ra. When the amount of rainfall Ra can be detected on the basis of a surrounding situation of the host vehicle M imaged by the camera 10, the vehicle system 1 may not include the rain sensor 18.

The communication device 20, for example, communicates (vehicle-to-vehicle communication) with other vehicles present around the host vehicle M, a parking area management device (to be described later), or various server devices using a cellular network, a Wi-Fi network, Bluetooth (registered trademark), a dedicated short range communication (DSRC), or the like, or communicates with various servers via a wireless base station.

The HMI 30 presents various pieces of information to an occupant of the host vehicle M and receives input operations of the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects an acceleration, a yaw-rate sensor that detects an angular speed about a vertical axis, an azimuth sensor that detects the direction of the host vehicle M, and the like.

The navigation apparatus 50 includes, for example, a global navigation satellite system (GNSS) receiver 51, a navigation HMI 52, and a route determiner 53. The navigation apparatus 50 stores first map information 54 in a storage device such as a hard disk drive (HDD) or a flash memory. The GNSS receiver 51 specifies the position of the host vehicle M on the basis of signals received from GNSS satellites. The position of the host vehicle M may be specified or complemented by an inertial navigation system (INS) which uses the output of the vehicle sensor 40. The navigation HMI 52 includes a display device, a speaker, a touch panel, keys, and the like. The navigation HMI 52 may be partially or entirely shared with the HMI 30. For example, the route determiner 53 determines a route (hereinafter a map route) from the position (or an input arbitrary position) of the host vehicle M specified by the GNSS receiver 51 to a destination input by an occupant using the navigation HMI 52 by referring to the first map information 54. The first map information 54 is information in which a road shape is represented by links indicating roads and nodes connected by links. The first map information 54 may include the curvature of a road, point of interest (POI) information, and the like.

The map route is output to the MPU 60. The navigation apparatus 50 may perform route guidance using the navigation HMI 52 on the basis of the map route. The navigation apparatus 50 may be realized by the functions of a terminal device such as a smartphone or a tablet terminal held by a user. The navigation apparatus 50 may transmit a present position and a destination to a navigation server via the communication device 20 and acquire a route equivalent to a map route from the navigation server.

The MPU 60 includes a recommended lane determiner 61, for example, and stores second map information 62 in a storage device such as a HDD or a flash memory. The recommended lane determiner 61 divides the map route provided from the navigation apparatus 50 into a plurality of blocks (for example, the route may be partitioned every 100 [m] in relation to a vehicle traveling direction) and determines a recommended lane for each block by referring to the second map information 62. The recommended lane determiner 61 determines that the host vehicle is traveling in a certain lane from the left.

When a branching point is present on a map route, the recommended lane determiner 61 determines a recommended lane so that the host vehicle M can travel along a reasonable route for proceeding to a branch destination.

The second map information 62 is map information with higher accuracy than the first map information 54. The second map information 62 includes, for example, information on the center of a lane or information on the boundaries of a lane. The second map information 62 may include road information, traffic regulation information, address information (address and postal codes), facility information, telephone number information, and the like. The second map information 62 may be updated as necessary by the communication device 20 communicating with other devices.

The wiper driver 70 drives the wiper 72 on the basis of the control of the automated driving control device 100. The wiper driver 70 is realized by a motor, for example. The wiper driver 70 is driven on the basis of the control of the automated driving control device 100. The wiper 72 is attached to the wiper driver 70 to wipe the window of the host vehicle M according to the driving of the wiper driver 70 to remove raindrops and contamination attached to the window. The wiper 72 is provided on the front window and/or the rear window of the host vehicle M, for example.

The driving operator 80 includes, for example, a steering wheel SW, an acceleration pedal, a brake pedal, a shift lever, a deformed steering wheel, a joystick, and other operators. Sensors that detect an amount of operation or the presence of an operation are attached to the driving operator 80, and the detection results are output to any one or both of the automated driving control device 100 or the travel drive force output device 200, the brake device 210, and the steering device 220.

The automated driving control device 100 includes, for example, a first controller 120, a second controller 160, a wiper controller 170, and a storage 180. The first controller 120 and the second controller 160 each are realized when a hardware processor such as a central processing unit (CPU) or the like executes a program (software). Moreover, some or all of these components may be realized by hardware (a circuit portion; including circuitry) such as large scale integration (LSI), an application specific integrated circuit (ASIC), a field-programmable gate array (FPGA), or a graphics processing unit (GPU) and may be realized by the cooperation of software and hardware. The program may be stored in advance in a storage device (a non-transitory storage medium) such as a HDD or a flash memory of the storage 180 and may be stored in a removable storage medium such as a DVD or a CD-ROM and be installed in a HDD or a flash memory of the automated driving control device 100 when a storage medium (a storage device including a non-transitory storage medium) is attached to a drive device. Wiper sensitivity information 182 is stored in the storage 180. The details of the wiper sensitivity information 182 will be described later.

The wiper controller 170 and the storage 180 may be realized by a device separated from the automated driving control device 100. For example, the wiper controller 170 and the storage 180 may be realized by a body electronic control unit (ECU) that controls a body system of a vehicle.

Figure 2:
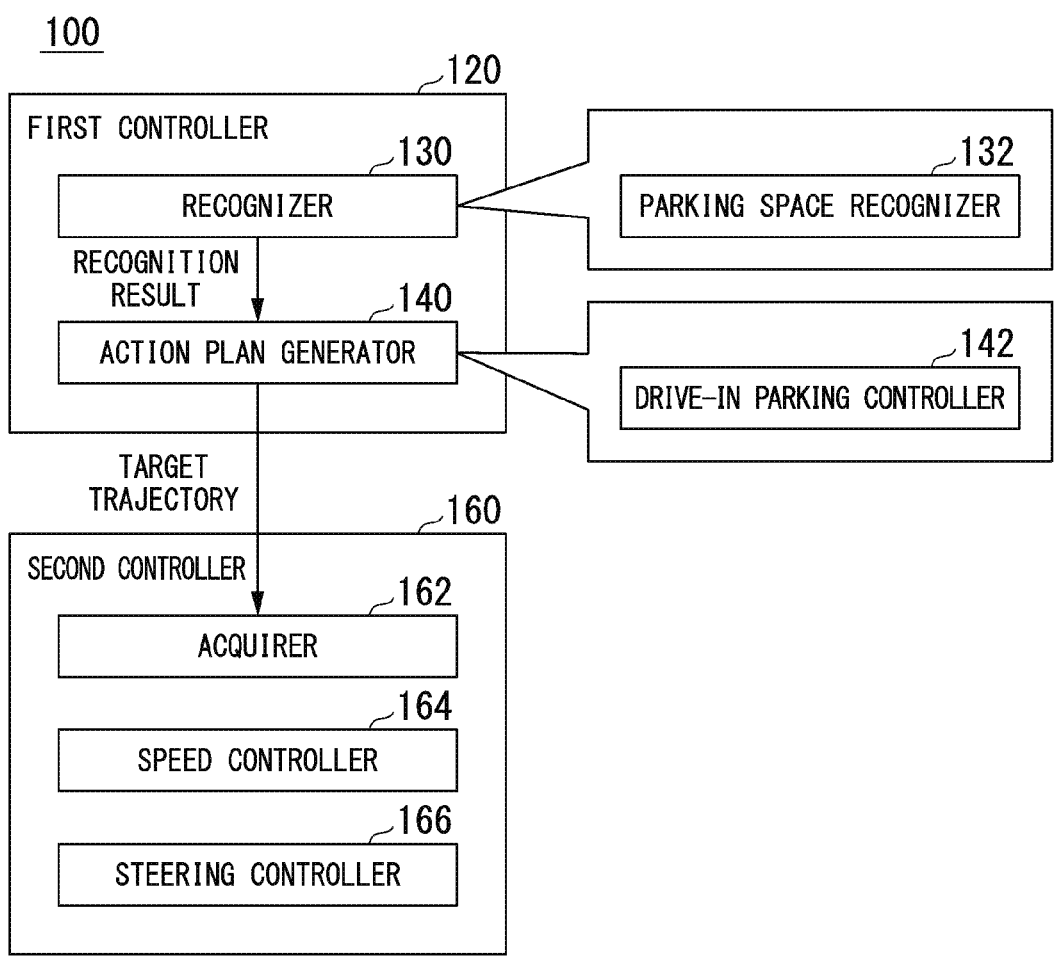
FIG. 2 is a diagram illustrating a functional configuration of a first controller 120 and a second controller 160.

FIG. 2 is a diagram illustrating a functional configuration of the first controller 120 and the second controller 160. For example, the first controller 120 includes a recognizer 130 and an action plan generator 140. For example, the first controller 120 realizes the functions of artificial intelligence (AI) and the functions of a predetermined model in parallel. For example, a function of "recognizing an intersection" may be realized by executing recognition of an intersection by deep learning and recognition based on a predetermined condition (signals, road marks, and the like which can be subjected to pattern matching) in parallel and scoring both recognition results to make comprehensive evaluation. In this way, the reliability of automated driving is secured.

The recognizer 130 recognizes the state such as a position of an object around the host vehicle M, a speed, an acceleration, and the like on the basis of the information input from the camera 10, the radar apparatus 12, and the finder 14 via the object recognition apparatus 16. The object position is recognized as the position on a relative coordinate system in which a representative point (the center of gravity, the center of a driving shaft, or the like) of the host vehicle M is at the origin, for example, and is used for control. The object position may be represented by a representative point such as the center of gravity or a corner of the object and may be represented by a region. The "state" of an object may include the acceleration or a jerk of an object or an "action state" (for example, whether the object has changed or is trying to change lanes).

For example, the recognizer 130 recognizes a lane (a traveling lane) in which the host vehicle M is traveling. For example, the recognizer 130 recognizes the traveling lane by comparing a pattern (for example, an arrangement of solid lines and broken lines) of lane marks obtained from the second map information 62 and a pattern of lane marks around the host vehicle M recognized from the images captured by the camera 10. The recognizer 130 may recognize the traveling lane by recognizing runway boundaries (road boundaries) including lane marks, road shoulders, curbs, a median strip, guard rails, and the like without being limited to the lane marks. In this recognition, the position of the host vehicle M acquired from the navigation apparatus 50 and the processing results of the INS may also be taken into consideration. The recognizer 130 recognizes a temporary stop line, an obstacle, a red sign, a toll booth, and other road events.

When recognizing the traveling lane, the recognizer 130 recognizes the position and a direction of the host vehicle M in relation to the traveling lane. For example, the recognizer 130 may recognize an offset from a lane center of a reference point of the host vehicle M and an angle between the traveling direction of the host vehicle M and an extension line of the lane center as the relative position and the direction of the host vehicle M in relation to the traveling lane. Instead of this, the recognizer 130 may recognize the position or the like of the reference point of the host vehicle M in relation to any one of side ends (lane marks or road boundaries) of the traveling lane as the relative position of the host vehicle M in relation to the traveling lane.

The recognizer 130 includes a parking space recognizer 132 that is activated in a drive-in parking event to be described later. The details of the function of the parking space recognizer 132 will be described later.

In principle, the action plan generator 140 generates a target trajectory along which the host vehicle M travels in the future automatically (regardless of an operation of a driver) so that the host vehicle M travels in a recommended lane determined by the recommended lane determiner 61 and it is possible to cope with a surrounding situation of the host vehicle M. The target trajectory includes a speed element, for example. For example, the target trajectory is represented as an arrangement of positions (trajectory points) that the host vehicle M has to reach. The trajectory points are positions that the host vehicle M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the host vehicle M has to reach at respective sampling time points of the predetermined sampling periods. In this case, the information of the target speed and the target acceleration is represented by the intervals of the trajectory points.

The action plan generator 140 may set an automated driving event when generating the target trajectory. The automated driving event includes a constant speed travel event, a low-speed following travel event, a lane changing event, a diverging event, a merging event, a takeover event, and a drive-in parking event in which an unmanned vehicle travels and parks during valet parking. The action plan generator 140 generates a target trajectory corresponding to an activated event. The action plan generator 140 includes a drive-in parking controller 142 activated when a drive-in parking event is executed. The details of the function of the drive-in parking controller 142 will be described later.

The second controller 160 controls the travel drive force output device 200, the brake device 210, and the steering device 220 so that the host vehicle M passes along the target trajectory generated by the action plan generator 140 at a scheduled time.

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores the information in a memory (not illustrated). The speed controller 164 controls the travel drive force output device 200 or the brake device 210 on the basis of a speed element included in the target trajectory stored in the memory. The steering controller 166 controls the steering device 220 according to the degree of curving of the target trajectory stored in the memory. The processes of the speed controller 164 and the steering controller 166 are realized by a combination of feedforward control and feedback control, for example. As an example, the steering controller 166 executes feedforward control according to the curvature of a road in front of the host vehicle M and feedback control based on an offset from a target trajectory in combination.

The travel drive force output device 200 outputs a travel drive force (torque) for a vehicle to travel to driving wheels. The travel drive force output device 200 includes a combination of an internal combustion engine, an electric motor, and a transmission and an electronic control unit (ECU) that controls these components. The power ECU controls the above-mentioned components according to the information input from the second controller 160 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the second controller 160 or the information input from the driving operator 80 so that brake torque corresponding to a braking operation is output to each wheel. The brake device 210 may include a backup mechanism that delivers hydraulic pressure generated by an operation of a brake pedal included in the driving operator 80 to a cylinder via a master cylinder. The brake device 210 is not limited to the above-described configuration and may be an electrically-controlled hydraulic-pressure brake device that controls an actuator according to information input from the second controller 160 and delivers hydraulic pressure of the master cylinder to a cylinder.

The steering device 220 includes, for example, a steering ECU and an electric motor.

The electric motor, for example, applies a force to a rack-and-pinion mechanism to change the direction of a steering wheel. The steering ECU drives an electric motor according to the information input from the second controller 160 or the information input from the driving operator 80 to change the direction of the steering wheel.

The wiper controller 170 controls the wiper driver 70 on the basis of the state of the host vehicle M recognized by the recognizer 130 and drives the wiper 72. In the following description, the wiper controller 170 controlling the wiper driver 70 and driving the wiper 72 is also referred to "the wiper controller 170 controlling the wiper 72".

[Drive-In Parking Event: During Entering]

Figure 3:
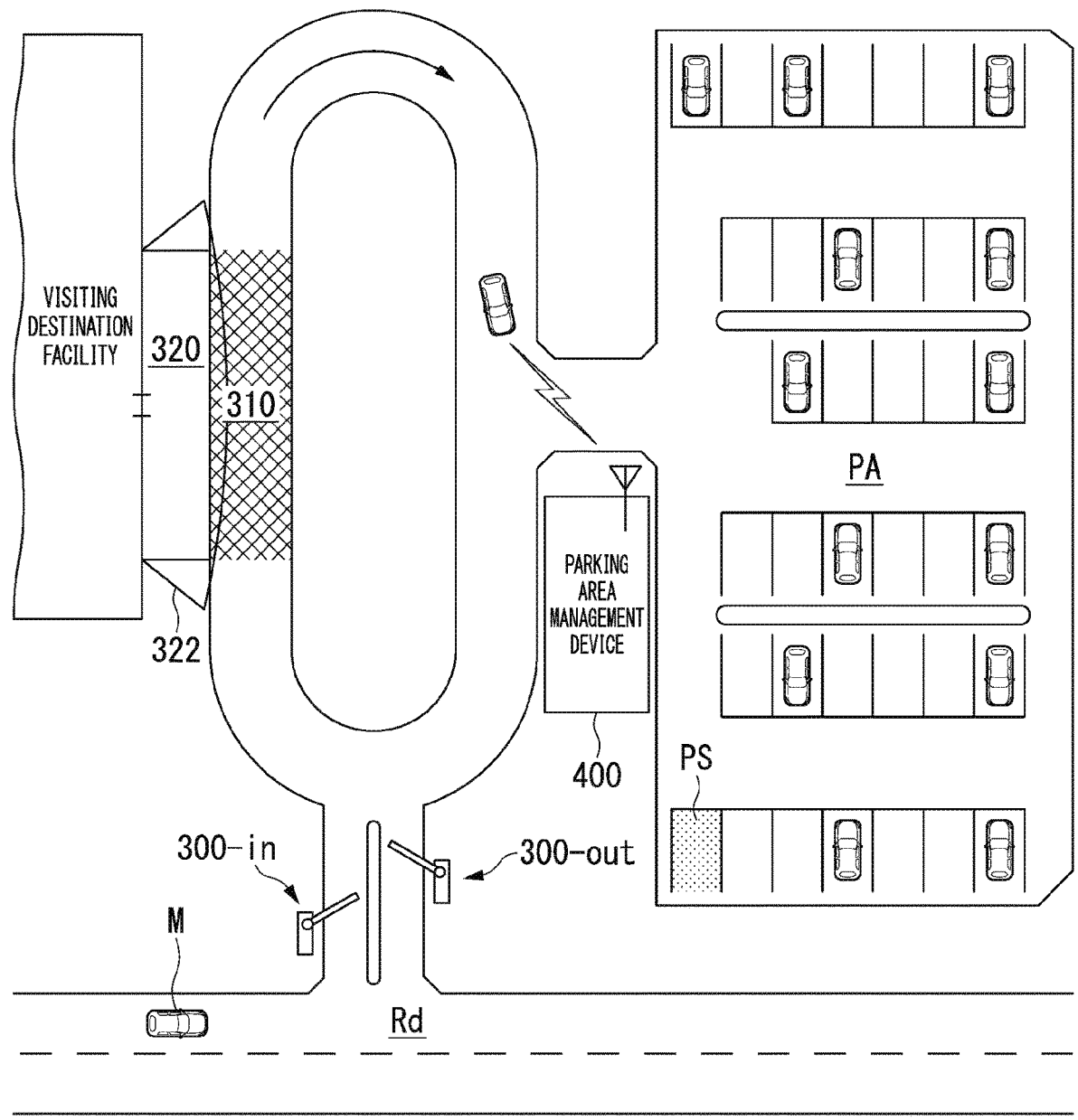
FIG. 3 is a diagram schematically illustrating a scene in which a drive-in parking event is executed.

The drive-in parking controller 142 causes the host vehicle M to park in a parking space on the basis of the information acquired from the parking area management device 400 with the aid of the communication device 20, for example. FIG. 3 is a diagram schematically illustrating a scene in which a drive-in parking event is executed. Gates 300-in and 300-out are provided in a route from a road Rd to a visiting destination facility. The host vehicle M passes through the gate 300-in and proceeds to a stopping area 310 by manual driving or automated driving. The stopping area 310 is near a platform area 320 connected to the visiting destination facility. Eaves 322 for blocking snow and rain are provided in the platform area 320.

After an occupant alights in the stopping area 310, the host vehicle M performs automated driving in an unmanned manner and starts a drive-in parking event of moving up to a parking space PS in a parking area PA. A trigger for starting the drive-in parking event may be an arbitrary operation of an occupant and may be a predetermined signal received wirelessly from the parking area management device 400, for example. When starting the drive-in parking event, the drive-in parking controller 142 controls the communication device 20 such that a parking request is sent to the parking area management device 400. The host vehicle M moves from the stopping area 310 to the parking area PA according to the guidance of the parking area management device 400 or while performing detection itself.

Figure 4:
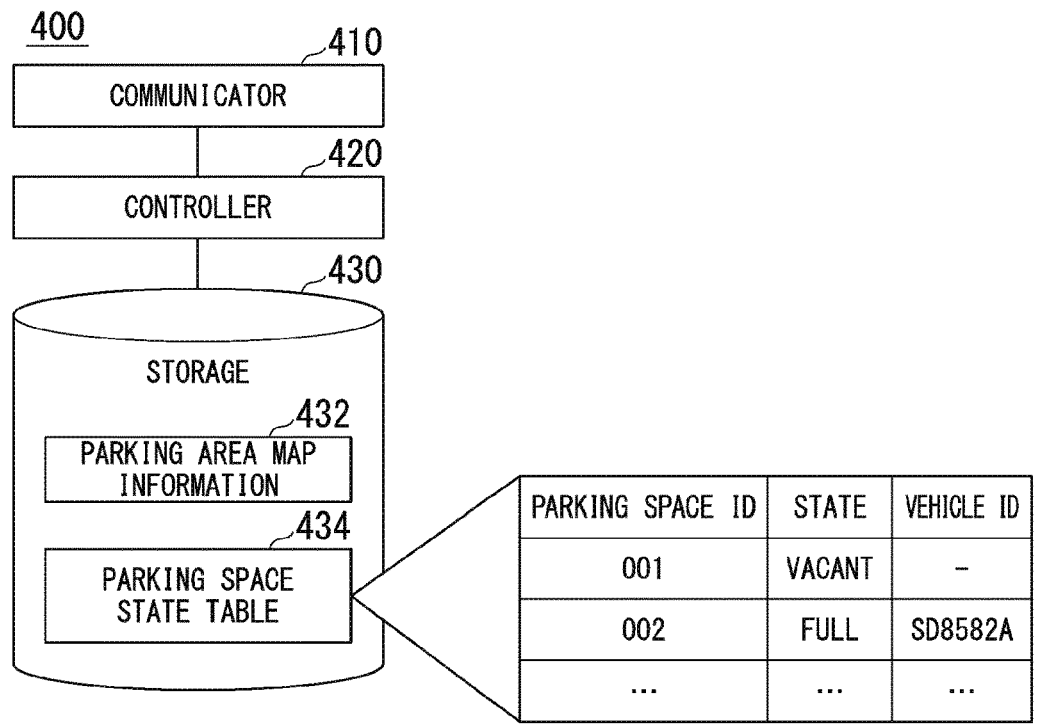
FIG. 4 is a diagram illustrating an example of a configuration of a parking area management device 400.

FIG. 4 is a diagram illustrating an example of a configuration of the parking area management device 400. The parking area management device 400 includes, for example, a communicator 410, a controller 420, and a storage 430. Information such as parking area map information 432 and parking space state table 434 is stored in the storage 430.

The communicator 410 wirelessly communicates with vehicles other than the host vehicle M. The controller 420 guides the vehicle to the parking space PS on the basis of the information acquired by the communicator 410 and the information stored in the storage 430. The parking area map information 432 is information showing the structure of the parking area PA geometrically. The parking area map information 432 includes the coordinates of respective parking spaces PS.

The parking space state table 434 correlates a parking space ID which is identification information of the parking space PS with a state indicating whether the space is in a vacant state or a full (parked in) state and a vehicle ID which is identification information of a parked vehicle in a full state.

When the communicator 410 receives a parking request from the vehicle, the controller 420 extracts the service providers PS in a vacant state by referring to the parking space state table 434, acquires the position of the extracted parking space PS from the parking area map information 432, and transmits an ideal route to the acquired position of the parking space PS to the vehicle using the communicator 410. The controller 420 instructs a specific vehicle to stop or move slowly as necessary on the basis of a positional relationship between a plurality of vehicle so that a plurality of vehicles do not proceed to the same position simultaneously.

In a vehicle (hereinafter referred to as the host vehicle M) having received the route, the drive-in parking controller 142 generates a target trajectory based on the route. When the vehicle comes near the target parking space PS, the parking space recognizer 132 recognizes parking frame lines or the like that define the parking space PS, recognizes a detailed position of the parking space PS, and provides the detailed position to the drive-in parking controller 142. Upon receiving the detailed position, the drive-in parking controller 142 corrects the target trajectory and causes the host vehicle M to be parked in the parking space PS.

[Drive-In Parking Event: During Exiting]

The drive-in parking controller 142 and the communication device 20 maintain an operation state even when the host vehicle M is parking. When the communication device 20 receives a pickup request from a terminal device of an occupant, the drive-in parking controller 142 activates the system of the host vehicle M to move the host vehicle M up to the stopping area 310. In this case, the drive-in parking controller 142 controls the communication device 20 to transmit a start request to the parking area management device 400. The controller 420 of the parking area management device 400 instructs a specific vehicle to stop or move slowly as necessary on the basis of a positional relationship between a plurality of vehicles so that a plurality of vehicles do not proceed to the same position simultaneously similarly to during entering. When the host vehicle M is moved up to the stopping area 310 and has an occupant on board, the drive-in parking controller 142 stops operating, and after that, manual driving or automated driving based on another functional unit starts.

Without being limited to the above description, the drive-in parking controller 142 may find a vacant parking space itself on the basis of the detection results obtained by the camera 10, the radar apparatus 12, the finder 14, or the object recognition apparatus 16 regardless of communication and cause the host vehicle M to park in the found parking space.

[Wiper Control]

The wiper controller 170 controls the wiper driver 70, for example such that the wiper 72 is driven in a "low-speed mode", "high-speed mode", or "automatic mode". The modes are switched between by a driver operating a wiper lever, for example. The wiper controller 170 continuously drives the wiper 72 in the "low-speed mode" or the "high-speed mode", and a wiper speed Vw in the "low-speed mode" is lower than the wiper speed Vw in the "high-speed mode".

In the "automatic mode", the wiper controller 170 drives the wiper 72 intermittently on the basis of the amount of rainfall Ra detected by the rain sensor 18, the wiper sensitivity Sw, and the speed Vv of the host vehicle M, for example. In the "automatic mode", the wiper controller 170 may drive the wiper 72 intermittently on the basis of the amount of rainfall Ra and the wiper sensitivity Sw (that is, regardless of the speed Vv).

The wiper sensitivity Sw is an index indicating a correlation between the amount of rainfall Ra detected by the rain sensor 18 and a time interval of the intermittent driving of the wiper 72. For example, when the wiper sensitivity Sw is high, the wiper controller 170 decreases the time interval of the intermittent driving for a certain amount of rainfall Ra as compared to when the wiper sensitivity Sw is low. The wiper sensitivity Sw is determined by an operation on an operating unit (not illustrated) provided in the wiper lever when the host vehicle M is not in an automated driving mode and is determined by the wiper controller 170 when the host vehicle M is in an automated driving mode. The wiper sensitivity Sw is set to any one of the four wiper sensitivities of Sw1 to Sw4, for example. Among the wiper sensitivities Sw1 to Sw4, the wiper sensitivity Sw4 is the highest, the wiper sensitivity Sw1 is the lowest, and the magnitudes of the sensitivity have relationships of Sw1<Sw2<Sw3<Sw4. The wiper sensitivity Sw may be only a threshold for determining turning on/off of operation of the wiper 72 with respect to the amount of rainfall Ra detected by the rain sensor 18.

Figure 5:
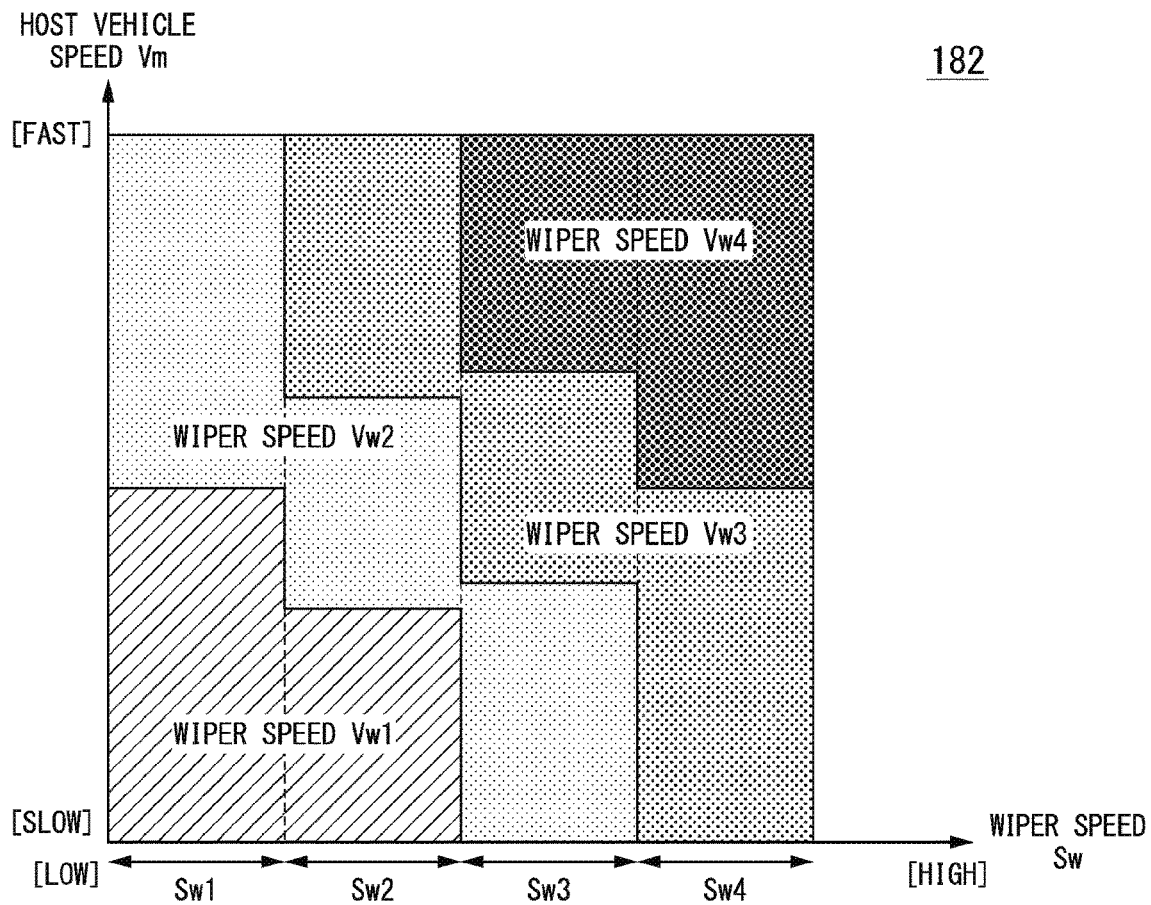
FIG. 5 is a diagram illustrating an example of the details of wiper sensitivity information 182.

The wiper controller 170 controls the wiper speed Vw according to the speed Vv of the host vehicle M. The wiper controller 170 controls the wiper 72 by referring to the wiper sensitivity information 182. FIG. 5 is a diagram illustrating an example of the details of the wiper sensitivity information 182. The wiper sensitivity information 182 is information indicating the relationship between the speed Vv of the host vehicle M, the wiper speed Vw, and the wiper sensitivity Sw. The wiper controller 170 controls the wiper speed Vw in the "automatic mode" in four steps of wiper speeds Vw1 to Vw4, for example. The wiper speeds Vw1 to Vw4 have relationships of Vw1<Vw2<Vw3<Vw4. The wiper sensitivity information 182 defines that the wiper speed Vw in a predetermined wiper sensitivity Sw changes according to the speed Vv of the host vehicle M, and the higher the speed Vv of the host vehicle M, the higher becomes the wiper speed Vw. As a result, the wiper controller 170 controls the wiper 72 so that the higher the speed Vv, the higher becomes the wiper speed Vw.

The wiper sensitivity information 182 defines that the lowest speed and the highest speed of the wiper speed Vw change according to the wiper sensitivity Sw, the higher the wiper sensitivity Sw, the higher becomes the wiper speed Vw, and the lower the wiper sensitivity Sw, the lower becomes the wiper speed Vw. For example, the wiper sensitivity information 182 defines that the wiper speed Vw1 is the lowest speed and the wiper speed Vw2 is the highest speed for the wiper sensitivity Sw1, and the wiper speed Vw3 is the lowest speed and the wiper speed Vw4 is the highest speed for the wiper sensitivity Sw4. As a result, the wiper controller 170 controls the wiper 72 so that the higher the wiper sensitivity Sw, the higher becomes the wiper speed Vw.

The wiper controller 170 may set the wiper speed Vw according to the amount of rainfall Ra detected by the rain sensor 18, for example, regardless of the wiper sensitivity Sw. In this case, the wiper controller 170 increases the wiper speed Vw as the amount of rainfall Ra increases and decreases the wiper speed Vw as the amount of rainfall Ra decreases. The wiper controller 170 may sets the timing interval of intermittently driving the wiper 72 according to the amount of rainfall Ra detected by the rain sensor 18, for example, regardless of the wiper sensitivity Sw. In this case, the wiper controller 170 decreases the time interval as the amount of rainfall Ra increases and increases the time interval as the amount of rainfall Ra decreases.

The wiper controller 170 may control the speed of the wiper speed Vw and the time interval of intermittently driving the wiper 72 in combination according to the amount of rainfall Ra detected by the rain sensor 18, for example, regardless of the wiper sensitivity Sw. In this case, the wiper controller 170 may increase the time interval while maintaining the wiper speed Vw constant when the amount of rainfall Ra is larger than a reference amount and may maintain the time interval constant while increasing the wiper speed Vw when the amount of rainfall Ra is larger than a reference amount. In this way, the wiper controller 170 can suppress formation of a water film during intermittent driving of the wiper. The wiper sensitivity Sw, the wiper speed Vw, and the time interval of intermittently driving the wiper 72 are examples of a "degree of operation of a wiper".

[Wiper Control in Drive-In Parking Event]

The wiper controller 170 decreases the wiper sensitivity Sw set at that time point according to the approach of the host vehicle M to the stopping area 310 when the drive-in parking controller 142 causes the host vehicle M to travel from the parking area PA to the stopping area 310 during exiting in the drive-in parking event, for example. During exiting in the drive-in parking event, the wiper controller 170 changes a wiper operation mode to "automatic mode" automatically when the operation mode of the wiper set by the wiper lever is not set to "automatic mode".

Figure 6:
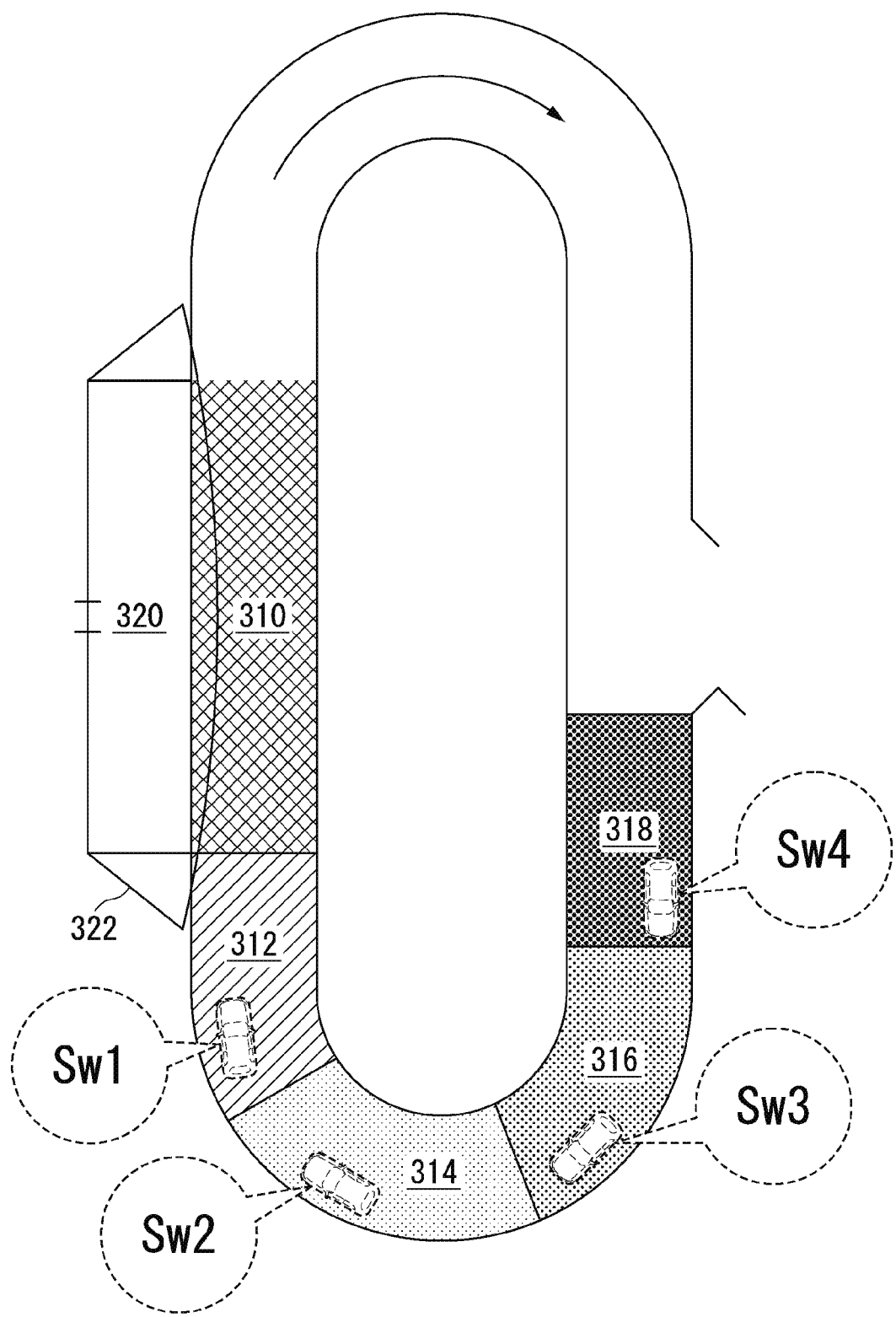
FIG. 6 is a diagram schematically illustrating the control of a wiper 72 during exiting of a drive-in parking event.

FIG. 6 is a diagram schematically illustrating the control of the wiper 72 during exiting in the drive-in parking event. First, the recognizer 130 virtually divides a route from the parking area PA in which the host vehicle M travels when allowing an occupant to board to the stopping area 310 and recognizes the divided route as four regions. In the following description, it is assumed that the recognizer 130 recognizes the route from the stopping area 310 to the parking area PA as four regions of a first region 312, a second region 314, a third region 316, and a fourth region 318 in ascending order of distance from the stopping area 310.

The recognizer 130 may divide and recognize the route from the parking area PA in which the host vehicle M travels when allowing an occupant to board to the stopping area 310 as five or more regions and may divide and recognize the route as fewer the four regions. The recognizer 130 may divide the route into predetermined distances and recognize separate regions, for example. In this case, the number of regions into which the recognizer 130 divides is small when the distance from the parking area PA to the stopping area 310 is short, and the number of regions into which the recognizer 130 divides is large when the distance is long.

The wiper controller 170 changes the wiper sensitivity Sw to the wiper sensitivity Sw4 (highest sensitivity) when the control of the drive-in parking controller 142 associated with exiting in the drive-in parking event starts. The wiper controller 170 gradually decreases the wiper sensitivity Sw from the wiper sensitivity Sw4 to the wiper sensitivity Sw1 during movement to the stopping area 310. For example, the wiper controller 170 changes the wiper sensitivity to the wiper sensitivity Sw4 when the position of the host vehicle M is the fourth region 318, changes the wiper sensitivity to the wiper sensitivity Sw3 when the position is the third region 316, changes the wiper sensitivity to the wiper sensitivity Sw2 when the position is the second region 314, and changes the wiper sensitivity to the wiper sensitivity Sw1 when the position is the first region 312.

Here, when the wiper controller 170 drives the wiper 72 with a high wiper sensitivity Sw, the wiper speed Vw increases and the time interval of intermittently driving the wiper 72 shortens. In this case, the raindrops wiped away by the wiper 72 may be scattered over a wide region around the host vehicle M greatly. As described above, since the occupant of the host vehicle M and a person who boards another vehicle are present in the stopping area 310, when the wiper controller 170 drives the wiper 72 with a high wiper sensitivity Sw, raindrops may splash toward these persons. The wiper controller 170 decreases the wiper sensitivity Sw according to the approach of the host vehicle M to the stopping area 310, whereby it is possible to minimize raindrops splashing toward persons present around the host vehicle M.

[Wiper Control Based on Other Surrounding Situation]

The wiper controller 170 may control the wiper 72 on the basis of some or all of the following.
  (1) Results of recognition of persons
  (2) Results of recognition of persons other than the occupant
  (3) Relationship to wiper sensitivity Sw change timing
  (4) Result of recognition of eaves 322
  (5) Relationship to wiper control in event other than drive-in parking event

[(1) Wiper Control Based on Results of Recognition of Person]

Figure 7:
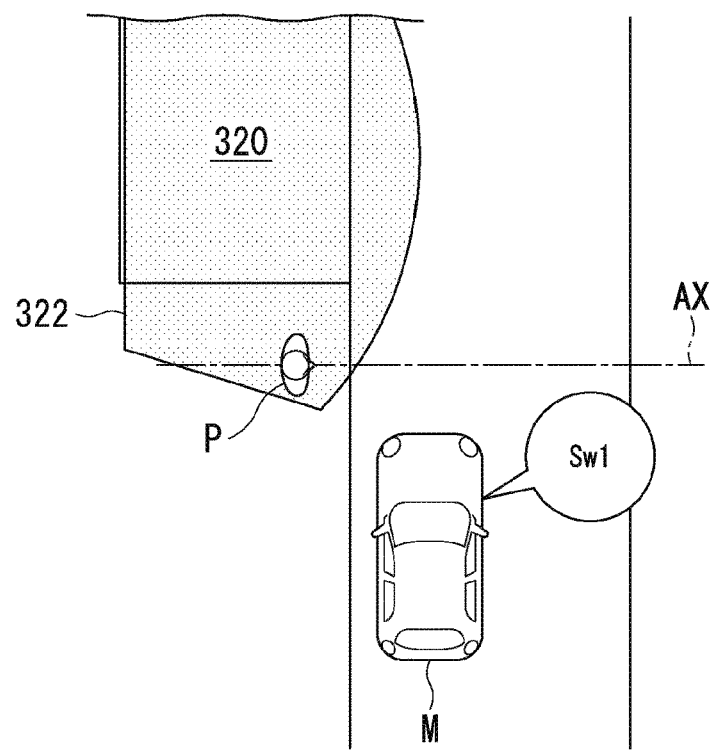
FIG. 7 is a diagram schematically illustrating the control of the wiper 72 based on a person recognition result.

When the results of recognition obtained by the recognizer 130 indicate that a person is present around (for example, the platform area 320) the stopping area 310, the wiper controller 170 decreases the wiper sensitivity Sw as compared to when no person is recognized. FIG. 7 is a diagram schematically illustrating the control of the wiper 72 based on the results of recognition of a person. The wiper controller 170 decreases the wiper sensitivity Sw on a side (the host vehicle M side) in front of the position of a person recognized by the recognizer 130, for example. The wiper controller 170 calculates an axis AX in a vehicle width direction (or a width direction of a road on which the host vehicle M travels) of the host vehicle M, for example, the axis passing through the center of a person P recognized by the recognizer 130 and recognizes the axis AX as the position of the person P. In this way, the wiper controller 170 can minimize the raindrops wiped away by the wiper 72, splashing toward the person recognized by the recognizer 130.

When the results of recognition obtained by the recognizer 130 indicate that a person is present around (for example, the platform area 320) the stopping area 310 and there is a possibility that the person loads or unloads luggage on or from a trunk, the wiper controller 170 may decrease the wiper sensitivity Sw as compared to when there is no possibility that the person loads or unloads luggage on or from a trunk. For example, when it is determined that the person recognized by the recognizer 130 carries luggage having a reference size or more, the wiper controller 170 determines that there is a possibility that the person loads or unloads luggage on or from a trunk. The luggage having a reference size or more is, for example, luggage that the person has bought in the visiting destination facility or a baby carriage. In this case, the wiper controller 170 decreases the wiper sensitivity Sw of the wiper 72 provided in a rear window, particularly. In this way, the wiper controller 170 can minimize the raindrops wiped away by the wiper 72 provided in a rear window, splashing toward the person recognized by the recognizer 130 when loading or unloading luggage.

[(2) Wiper Control Based on Results of Recognition of Person Other than Occupant]

Figure 8:
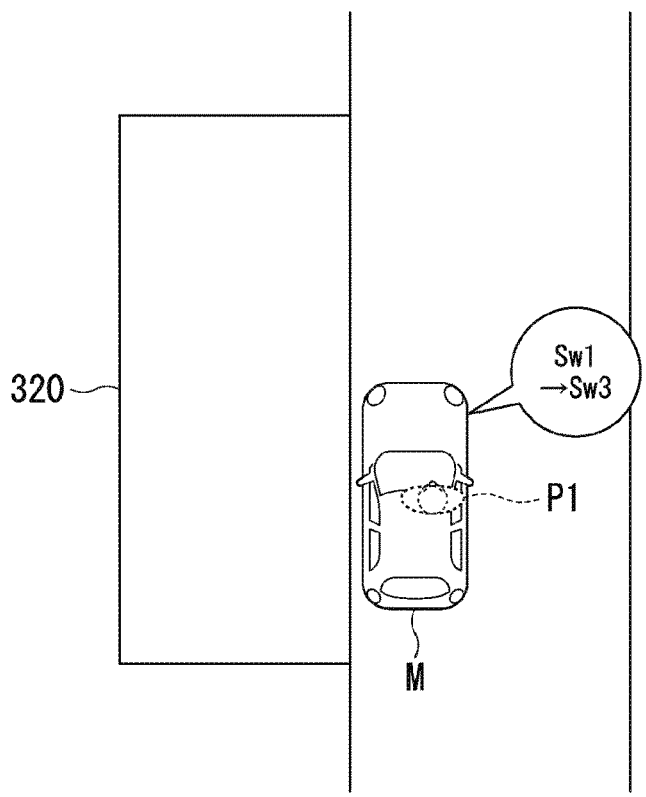
FIG. 8 is a diagram schematically illustrating the control of the wiper 72 when only a person P1 getting in a host vehicle M is present in a platform area 320.
Figure 9:
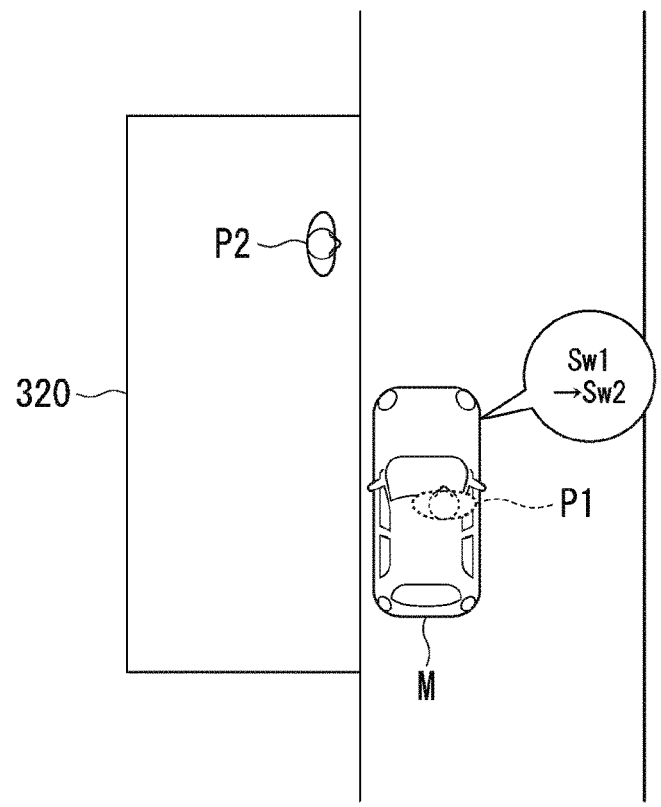
FIG. 9 is a diagram schematically illustrating the control of the wiper 72 when a person P2 other than an occupant and a person getting in the host vehicle M is present in the platform area 320.

The wiper controller 170 restores the wiper sensitivity Sw to a wiper sensitivity Sw determined in advance by an operator of the wiper lever after the occupant of the host vehicle M boards the vehicle in the stopping area 310. FIG. 8 is a diagram schematically illustrating the control of the wiper 72 when only a person (hereinafter person P1) who boards the host vehicle M is present in the platform area 320. FIG. 9 is a diagram schematically illustrating the control of the wiper 72 when the person P1 who boards the host vehicle M and a person P2 other than the occupant are present in the platform area 320. First, the wiper controller 170 specifies the occupant of the host vehicle M among persons present around the host vehicle M, for example. Specifically, the wiper controller 170 specifies a person having a smart key of the host vehicle M as the occupant of the host vehicle M on the basis of an image recognition result obtained by the camera 10 or a communication result obtained by the communication device 20. The wiper controller 170 may specify a person who approaches the host vehicle M, a person who tries to open the door of the host vehicle M, a person who raises his/her hand to stop the host vehicle M, or the like as the occupant of the host vehicle M and may specify the occupant of the host vehicle M on the basis of the information indicating the features of a person registered in advance as the occupant of the host vehicle M. The wiper controller 170 restores the wiper sensitivity Sw to a predetermined wiper sensitivity Sw (in the drawing, the wiper sensitivity Sw3) immediately after the person P1 boards the host vehicle M when the person present around the stopping area 310 is the person P1 only. When the persons P1 and P2 are present around the stopping area 310, the wiper controller 170 restores the wiper sensitivity Si to a predetermined wiper sensitivity Sw after the host vehicle M has completely moved away from the stopping area 310 without restoring the wiper sensitivity Sw immediately (in the drawing, to the wiper sensitivity Sw2 temporarily) after the person P1 boards the host vehicle M. The wiper controller 170 may restore the wiper sensitivity Sw to a predetermined wiper sensitivity Sw when the host vehicle M moves away from the stopping area 310. When the wiper controller 170 does not restore the wiper sensitivity Sw to the predetermined wiper sensitivity Sw (or decreases the degree of restoring to the original wiper sensitivity), since it is difficult to secure the visibility of the host vehicle M, the action plan generator 140 allows the host vehicle M to travel slowly or does not allow the host vehicle M to travel until the person P2 is away from the host vehicle M.

[(3) Wiper Control Based on Wiper Sensitivity Sw Changing Timing]

The wiper controller 170 allows the wiper 72 to wipe a window at a timing at which the wiper sensitivity Sw is changed (decreased) on the basis of the above-described conditions. Here, when the wiper sensitivity Sw is decreased, since the wiper controller 170 may not drive the wiper 72 at a timing at which the wiper 72 would have been driven to wipe the window, there is a possibility that it may be difficult to secure the visibility of the host vehicle M. In order to prevent this, the wiper controller 170 drives the wiper 72 to wipe the window at a timing of decreasing the wiper sensitivity Sw whereby it is possible to suppress the degree of blocking the visibility of the host vehicle M due to decrease in the wiper sensitivity Sw as much as possible.

[(4) Wiper Control Based on Results of Recognition of Eaves 322]

Figure 10:
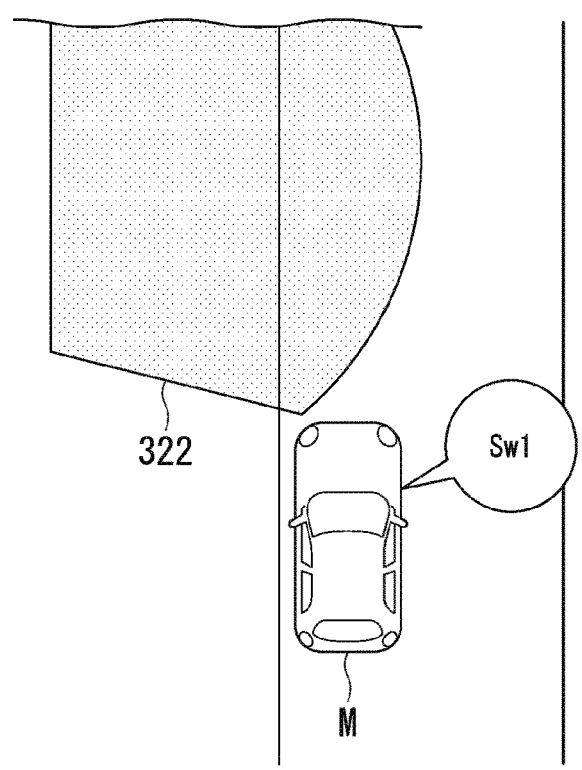
FIG. 10 is a diagram schematically illustrating the control of the wiper 72 based on the results of recognition of eaves 322.

While a case in which the stopping area 310 is near the platform area 320 has been described, there is no limitation thereto, but, for example, the stopping area 310 may be in a region near a region covered by the eaves 322. FIG. 10 is a diagram schematically illustrating the control of the wiper 72 based on the results of recognition of the eaves 322. In this case, the drive-in parking controller 142 causes the host vehicle M to move to a position under the eaves 322 recognized by the recognizer 130 during exiting in the drive-in parking event, for example. The wiper controller 170 decreases the predetermined wiper sensitivity Sw according to an approach of the host vehicle M to the eaves 322 when the drive-in parking controller 142 causes the host vehicle M to travel from the parking area PA to the eaves 322. The process of the wiper controller 170 decreasing the wiper sensitivity Sw is similar to the process when the host vehicle M approaches the platform area 320, and the description thereof will be omitted. The stopping area 310 may not be the eaves 322 but may be a region near a region in which a person can wait arrival of the host vehicle M regardless of wind or rain. In this way, the wiper controller 170 can control the wiper 72 in an appropriate degree while causing the host vehicle M to travel up to a position where an occupant waits even when the platform area 320 is not set in advance.

[(5) Wiper Control Based on Event Other than Drive-in Parking Event]

The wiper controller 170 may change the wiper sensitivity Sw similarly when picking up the occupant of the host vehicle M other than travel associated with a drive-in parking event. In this case, the wiper controller 170 changes the wiper sensitivity Sw on the basis of the position of an occupant and the position of the eaves 322 used when the occupant waits for the host vehicle M when the second controller 160 causes the host vehicle M to travel along the target trajectory which is generated by the action plan generator 140 and is directed to the position of the occupant of the host vehicle M.

[Operation Flow]

Figure 11:
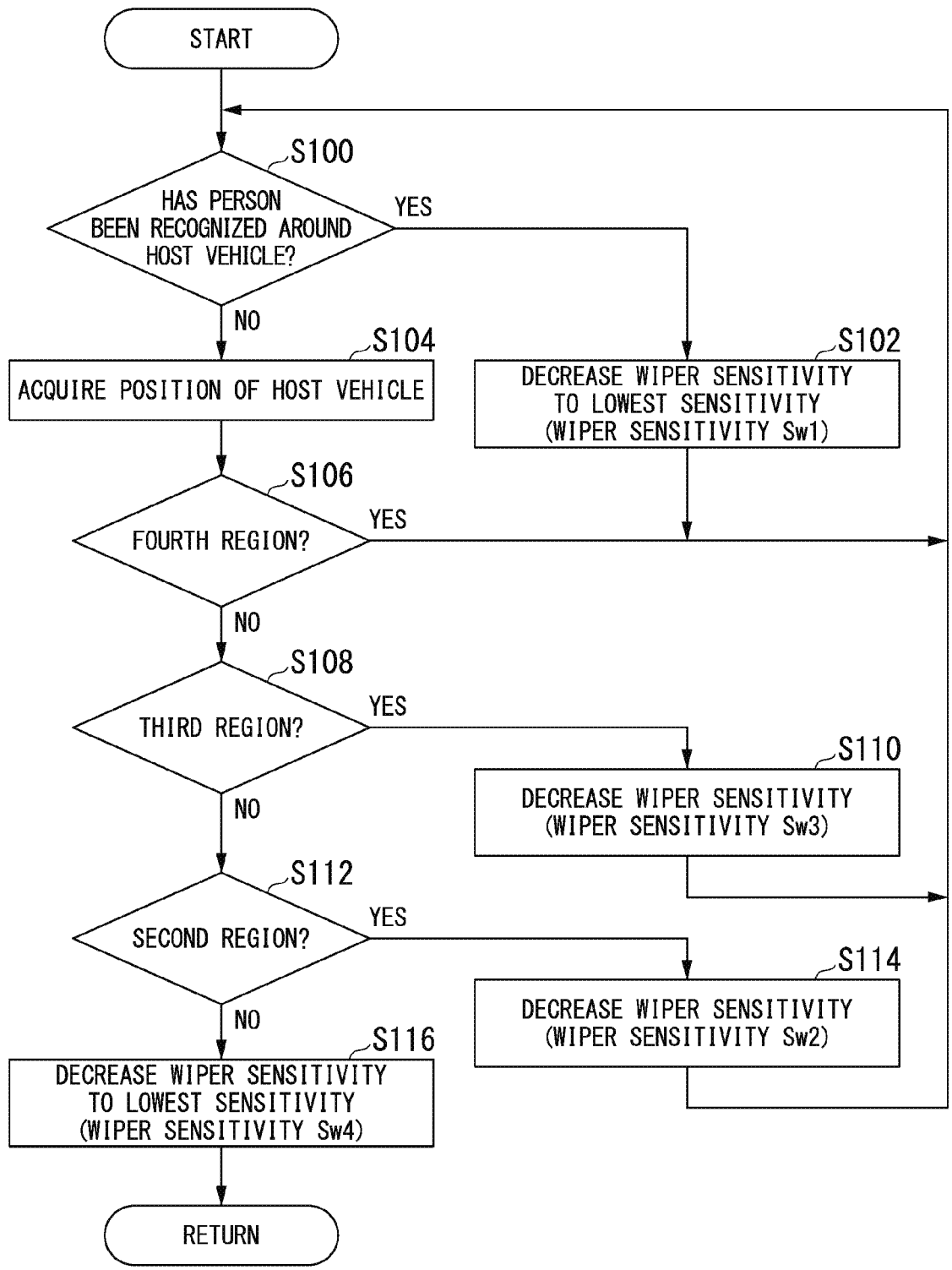
FIG. 11 is a flowchart (a first example) illustrating the flow of processes executed by an automated driving control device 100.

FIG. 11 is a flowchart (a first example) illustrating the flow of processes executed by the automated driving control device 100. The flowchart illustrated in FIG. 11 illustrates an example of the control of the wiper 72 performed when the drive-in parking controller 142 causes the host vehicle M to travel from the parking area PA to the stopping area 310. Hereinafter, it is assumed that the predetermined wiper sensitivity Sw is the wiper sensitivity Sw4. First, the wiper controller 170 determines whether the results of recognition obtained by the recognizer 130 indicate that a person is present around the host vehicle M (step S100). When it is determined that a person is present around the host vehicle M, the wiper controller 170 decreases the wiper sensitivity Sw to the lowest sensitivity (in this example, the wiper sensitivity Sw1) (step S102). The wiper controller 170 maintains the wiper sensitivity Sw at the lowest sensitivity until no person is present around the host vehicle M. When it is determined that no person is present around the host vehicle M, the wiper controller 170 acquires the present position of the host vehicle M from the navigation apparatus 50 (step S104). The wiper controller 170 determines whether the present position of the host vehicle M is the fourth region 318 (step S106). The wiper controller 170 does not change the wiper sensitivity Sw before it is determined that the present position of the host vehicle M is the fourth region 318, and the flow proceeds to step S100.

When it is determined that the present position of the host vehicle M is not the fourth region 318, the wiper controller 170 determines whether the present position is the third region 316 (step S108). When it is determined that the present position of the host vehicle M is the third region 316, the wiper controller 170 decreases the wiper sensitivity Sw to be lower than the wiper sensitivity Sw in the fourth region 318 (in this example, the wiper sensitivity Sw4) (step S110). In this case, the wiper controller 170 changes the wiper sensitivity Sw in the third region 316 to the wiper sensitivity Sw3 and the flow proceeds to step S100. When it is determined that the present position of the host vehicle M is not the third region 316, the wiper controller 170 determines whether the present position is the second region 314 (step S112). When it is determined that the present position of the host vehicle M is the second region 314, the wiper controller 170 decreases the wiper sensitivity Sw to be lower than the wiper sensitivity Sw in the third region 316 (in this example, the wiper sensitivity Sw3) (step S114). In this case, the wiper controller 170 changes the wiper sensitivity Sw in the second region 314 to the wiper sensitivity Sw2, for example, and the flow proceeds to step S100. When it is determined that the present position of the host vehicle M is not any one of the fourth to second regions 318 to 314, the wiper controller 170 determines that the present position is the first region 312 and decreases the wiper sensitivity Sw to the lowest sensitivity (in this example, the wiper sensitivity Sw1) (step S116).

Figure 12:
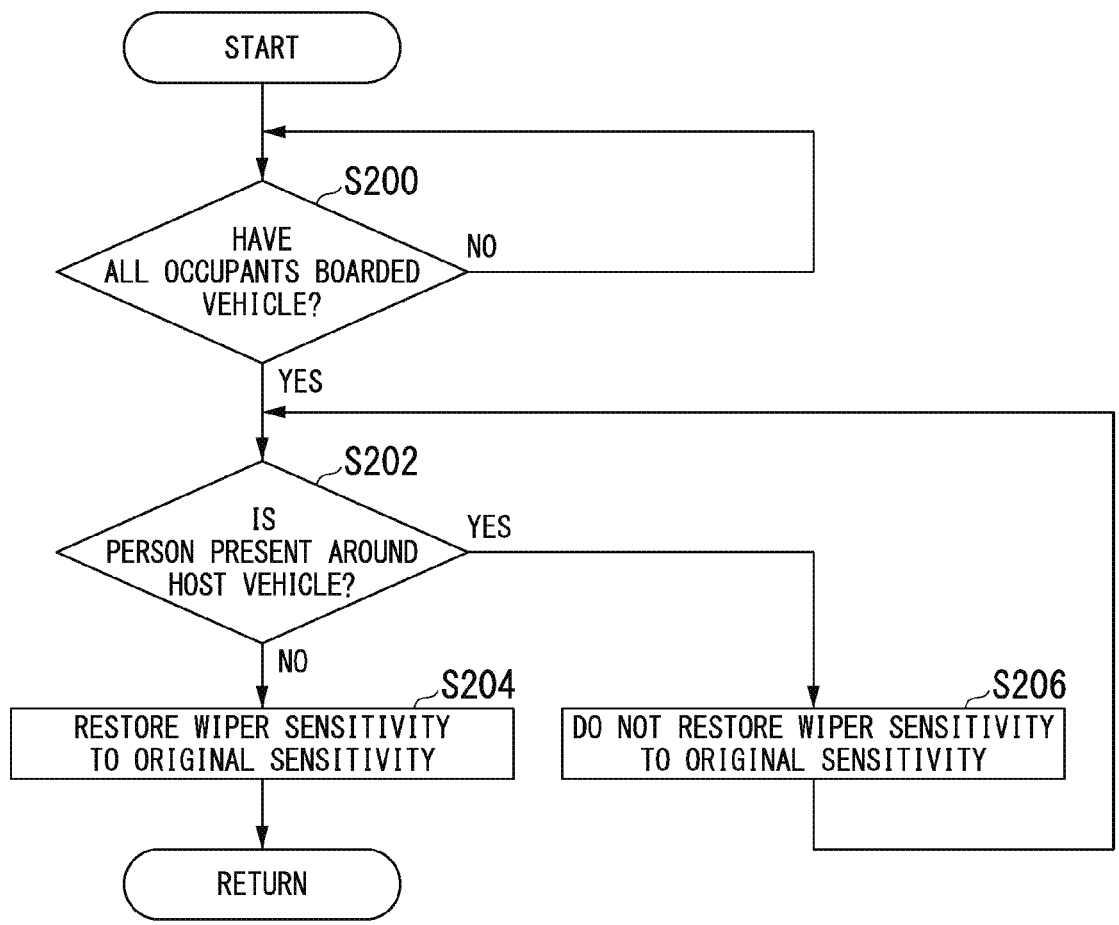
FIG. 12 is a flowchart (a second example) illustrating the flow of processes executed by the automated driving control device 100.

FIG. 12 is a flowchart (a second example) illustrating the flow of processes executed by the automated driving control device 100. The flowchart illustrated in FIG. 12 illustrates an example of the control of the wiper 72 performed when the host vehicle M moves away from the stopping area 310 after the occupant of the host vehicle M boards the vehicle in the stopping area 310. First, the wiper controller 170 determines whether all occupants of the host vehicle M have boarded the vehicle (step S200). When it is determined that all occupants of the host vehicle M have boarded the vehicle, the wiper controller 170 determines whether a person other than the occupant of the host vehicle M is present around (for example, the platform area 320) of the host vehicle M (step S202). When it is determined that a person other than the occupant of the host vehicle M is not present around the host vehicle M, the wiper controller 170 restores the wiper sensitivity Sw to a predetermined wiper sensitivity Sw (that is, the wiper sensitivity Sw4) (step S204). The wiper controller 170 does not restore the wiper sensitivity Sw to the original wiper sensitivity when a person other than the occupant of the host vehicle M is present around the host vehicle M (step S206).

While a case in which the wiper controller 170 changes the wiper sensitivity Sw during exiting in the drive-in parking event has been described, there is no limitation thereto. The wiper controller 170 may change the wiper speed Vw during exiting in the drive-in parking event, for example. In this case, the wiper controller 170 decreases the wiper speed Vw according to approach of the host vehicle M to the stopping area 310 when the drive-in parking controller 142 causes the host vehicle M to travel from the parking area PA to the stopping area 310. In this case, the wiper controller 170 may not necessarily change the operation mode of the wiper set by the wiper lever to "automatic mode" during exiting in the drive-in parking event.

The wiper controller 170 may increase the wiper sensitivity Sw set at that time point according to the degree of separation of the host vehicle M from the stopping area 310 when the action plan generator 140 causes the host vehicle M to move away from the stopping area 310 (the platform area 320). The wiper controller 170 increases the wiper sensitivity Sw set at that time point as the host vehicle M moves away from the stopping area 310 on the basis of the present position of the host vehicle M and the position of the stopping area 310, for example. In this way, the wiper controller 170 can minimize raindrops splashing toward a person present around the host vehicle M even when the host vehicle M moves away from the platform area 320.

[Hardware Configuration]

Figure 13:
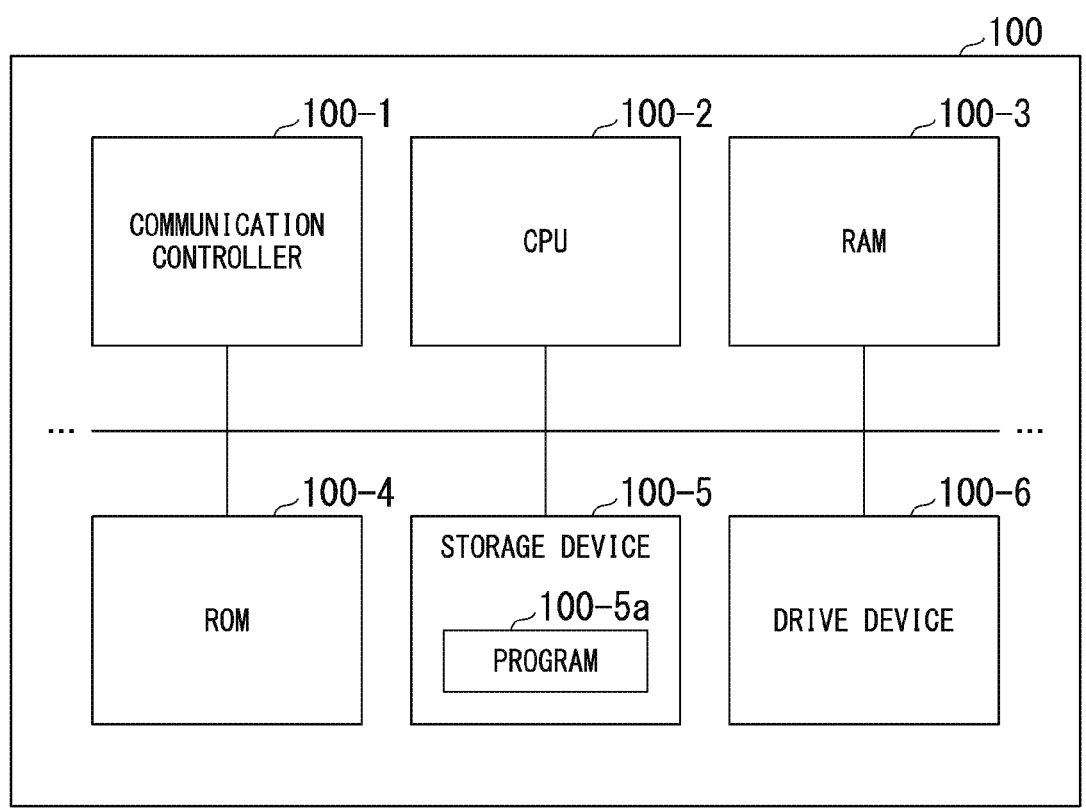
FIG. 13 is a diagram illustrating an example of a hardware configuration of the automated driving control device 100 of the embodiment.

FIG. 13 is a diagram illustrating an example of a hardware configuration of the automated driving control device 100 according to the embodiment. As illustrated in the drawing, the automated driving control device 100 includes a communication controller 100-1, a CPU 100-2, a random access memory (RAM) 100-3 used as a working memory, a read only memory (ROM) 100-4 storing a boot program or the like, a storage device 100-5 such as a flash memory or a hard disk drive (HDD), and a drive device 100-6 which are connected to each other by an internal bus or a dedicated communication line. The communication controller 100-1 communicates with the components other than the automated driving control device 100. A program 100-5*a* executed by the CPU 100-2 is stored in the storage device 100-5. This program is deployed onto the RAM 100-3 by a direct memory access (DMA) controller (not illustrated) or the like and is executed by the CPU 100-2. In this way, some or all components of the wiper controller 170 are realized.

The above-described embodiments may be expressed as follows.

A vehicle control device comprising:
a storage device that stores a program; and
a hardware processor, wherein
the hardware processor executes the program stored in the storage device to execute:
recognizing a surrounding environment of a vehicle;
performing speed control and steering control of the vehicle regardless of an operation of an occupant on the basis of a recognition result;
controlling a wiper attached to a window of the vehicle; and
changing a degree of operation of the wiper according to a boarding position and a degree of approach when the vehicle moves to the boarding position at which the occupant boards the vehicle after the vehicle starts traveling or when the vehicle starts traveling to move away from the boarding position after the occupant alights from the vehicle.

While modes for carrying out the present invention have been described using embodiments, the present invention is not limited to these embodiments, but various modifications and replacements can be made without departing from the spirit of the present invention.

What is claimed is:

1. A vehicle control system comprising:
a recognizer that recognizes a surrounding environment of a vehicle;
a driving controller that performs speed control and steering control of the vehicle regardless of an operation of an occupant on the basis of a recognition result obtained by the recognizer; and
a wiper controller that controls a wiper attached to a window of the vehicle, wherein
the wiper controller changes a degree of operation of the wiper according to a distance along a route from the vehicle to a boarding position when the vehicle moves to the boarding position at which an occupant boards the vehicle after the vehicle starts traveling under the control of the driving controller or according to a distance along a route from an alighting position to the vehicle when the vehicle starts traveling to move away from the alighting position at which the occupant alights from the vehicle under the control of the driving controller after the occupant alights from the vehicle at the alighting position.

2. The vehicle control system according to claim 1, wherein
the wiper controller changes a degree of operation of the wiper according to the distance along the route from the vehicle to the boarding position at which the occupant boards the vehicle when the driving controller stops the vehicle to allow the occupant to board the vehicle after causing the vehicle to start traveling from a state in which the vehicle is parked.

3. The vehicle control system according to claim 1, wherein
the wiper controller changes a degree of operation of the wiper according to the distance along the route from the vehicle to the boarding position at which the occupant boards the vehicle when the driving controller stops the vehicle to allow the occupant to board the vehicle after causing the vehicle to start traveling from a state in which the vehicle is parked in an unmanned parking area, and
the position at which the occupant boards the vehicle is a boarding area determined in advance in correspondence to the unmanned parking area.

4. The vehicle control system according to claim 1, wherein
the wiper controller changes a degree of operation of the wiper according to the distance along the route from the vehicle to a stopping area when the driving controller stops the vehicle in the stopping area having eaves to allow the occupant to board the vehicle after causing the vehicle to start traveling.

5. The vehicle control system according to claim 1, wherein
the wiper controller decreases the degree of operation of the wiper when the recognizer recognizes a person around the boarding position at which the occupant boards the vehicle as compared to when no person is recognized.

6. The vehicle control system according to claim 5, wherein
the wiper controller decreases the degree of operation of the wiper on a side in front of a position of the person recognized by the recognizer.

7. The vehicle control system according to claim 5, wherein
the wiper controller restores the degree of operation of the wiper to an original state after the occupant boards the vehicle when the person recognized by the recognizer is only the occupant of the vehicle.

8. The vehicle control system according to claim 7, wherein
the wiper controller decreases a degree of restoring the degree of operation of the wiper to an original state when the persons recognized by the recognizer is not only the occupant of the vehicle as compared to when the recognized person is only the occupant of the vehicle.

9. The vehicle control system according to claim 1, wherein
the wiper controller causes the wiper to wipe the window before changing the degree of operation of the wiper.

10. The vehicle control system according to claim 1, wherein
the wiper controller changes the degree of operation of the wiper on the basis of a position of eaves and the distance along the route from the vehicle to the boarding position when the recognizer recognizes that the eaves are present at the boarding position at which the occupant boards the vehicle.

11. The vehicle control system according to claim 1, wherein
when the driving controller stops the vehicle to allow the occupant to board the vehicle after causing the vehicle to start traveling from a state in which the vehicle is parked at a parking position, the recognizer recognizes and divides a route from the parking position to the boarding position into a plurality of regions, and
the wiper controller changes the degree of operation of the wiper according to which of the plurality of regions the vehicle separated from the boarding position by the distance along the route from the vehicle to the boarding position is traveling in.

12. The vehicle control system according to claim 11, wherein
the recognizer recognizes and divides the route from the parking position to the boarding position into the plurality of regions by a predetermined distance.

13. The vehicle control system according to claim 1, wherein
the vehicle moves to the boarding position or moves away from the alighting position after the vehicle starts traveling under the control by automated driving of the driving controller.

14. A vehicle control method for causing a computer to execute:
recognizing a surrounding environment of a vehicle;
performing speed control and steering control of the vehicle regardless of an operation of an occupant on the basis of a recognition result;
controlling a wiper attached to a window of the vehicle; and
changing a degree of operation of the wiper according to a distance along a route from the vehicle to a boarding position when the vehicle moves to the boarding position at which the occupant boards the vehicle after the vehicle starts traveling or according to a distance along a route from an alighting position to the vehicle when the vehicle starts traveling to move away from the alighting position at which the occupant alights from the vehicle after the occupant alights from the vehicle at the alighting position.

15. A storage medium storing a program for causing a computer to execute:
recognizing a surrounding environment of a vehicle;
performing speed control and steering control of the vehicle regardless of an operation of an occupant on the basis of a recognition result;
controlling a wiper attached to a window of the vehicle; and
changing a degree of operation of the wiper according to a distance along a route from the vehicle to a boarding position when the vehicle moves to the boarding position at which the occupant boards the vehicle after the vehicle starts traveling or according to a distance along a route from an alighting position to the vehicle when the vehicle starts traveling to move away from the alighting position at which the occupant alights from the vehicle after the occupant alights from the vehicle at the alighting position.

\* \* \* \* \*